United States Patent [19]
Ahl

[11] 3,901,477
[45] Aug. 26, 1975

[54] APPARATUS FOR MAKING CONCRETE BUILDINGS IN ACCORDANCE WITH SLIDE MOLDING TECHNIQUES

[76] Inventor: Bernhard Ahl, Am Zehnpfennigshof 13, 5038 Hahnwald, Cologne, Germany

[22] Filed: Mar. 18, 1974

[21] Appl. No.: 452,048

[30] Foreign Application Priority Data
Mar. 21, 1973 Germany............................ 2314025

[52] U.S. Cl. .............................................. 254/107
[51] Int. Cl.² ........................................... B66F 1/00
[58] Field of Search .......................... 254/105–107; 249/10–12, 20, 189, 192, 193; 264/33, 34

[56] References Cited
UNITED STATES PATENTS

| | | | |
|---|---|---|---|
| 3,085,787 | 4/1963 | Gattnar............................. | 254/106 |
| 3,203,669 | 8/1965 | Johansson.......................... | 254/107 |
| 3,334,865 | 8/1967 | Catu ................................. | 254/106 |

FOREIGN PATENTS OR APPLICATIONS

| | | | |
|---|---|---|---|
| 1,531,334 | 9/1967 | Germany........................... | 254/107 |

Primary Examiner—Al Lawrence Smith
Assistant Examiner—Robert C. Watson
Attorney, Agent, or Firm—Diller, Brown, Ramik & Wight

[57] ABSTRACT

This disclosure relates to apparatus for making concrete buildings in accordance with slide molding techniques comprising an upper pair of gripping jaws and a lower pair of gripping jaws, means between the upper and lower pair of gripping jaws for imparting relative reciprocal motion therebetween, each pair of gripping jaws being pivotally connected to a lever, means mounting each lever for pivoting motion to move the jaws of each pair of gripping jaws obliquely toward and away from each other to respectively clamp and unclamp the same relative to a vertical support, and spring means remote from each of the pivot mounting means for biasing at least one of the jaws of each of the pair of upper and lower gripping jaws toward the clamped position thereof relative to the vertical support.

8 Claims, 7 Drawing Figures

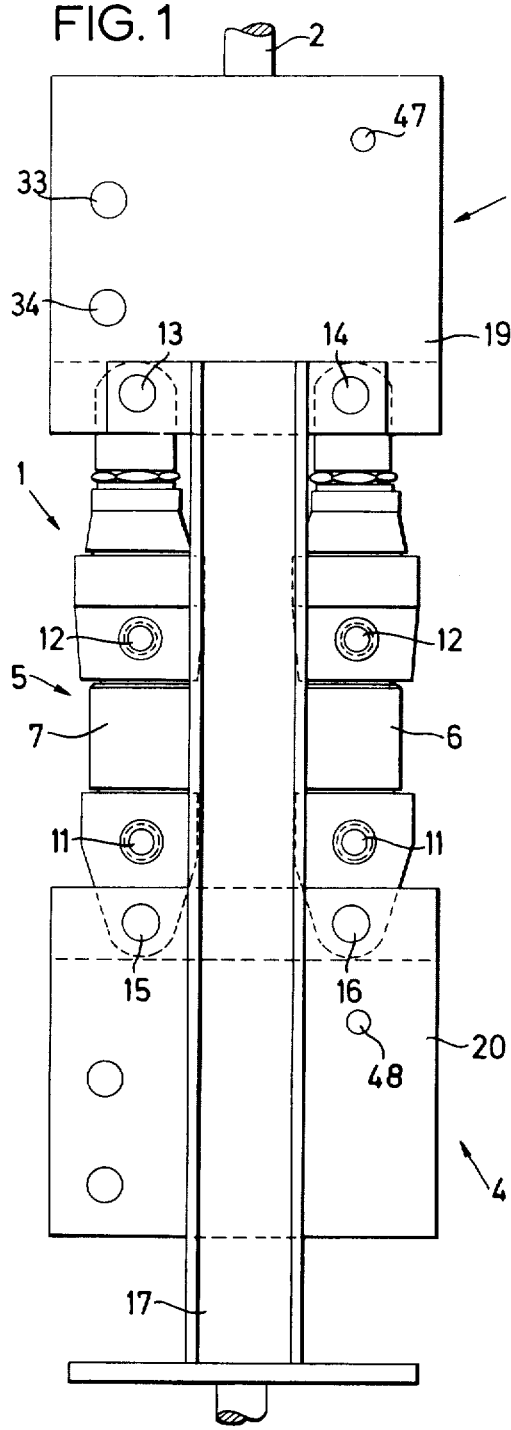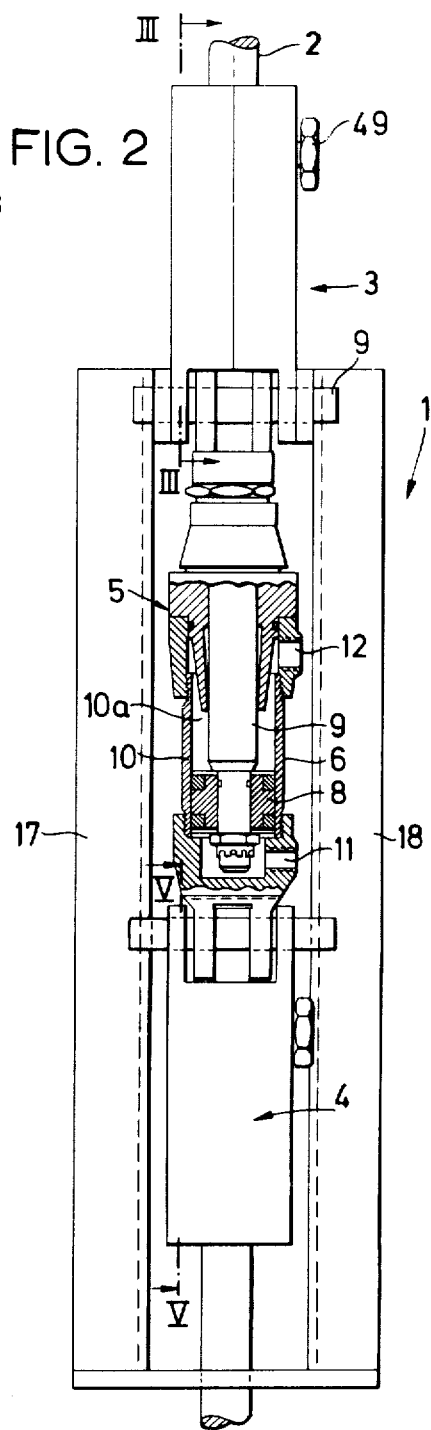

APPARATUS FOR MAKING CONCRETE BUILDINGS IN ACCORDANCE WITH SLIDE MOLDING TECHNIQUES

The present invention is directed to an apparatus for making concrete buildings in accordance with slide molding techniques or systems, and in accordance therewith there is provided superimposed gripping heads which are moved or reciprocated mechanically or by lifting cylinders through the action of a pressure medium, such as compressed air or a hydraulic liquid. In each gripping head there are a pair of gripping jaws which engage a vertical support, generally a steel bar, with the jaws being under the biasing pressure of a spring so that the jaws can clampingly engage the vertical support and retain a concrete mold associated therewith at a desired elevation. The gripping jaws are generally wedgeshaped or may be eccentric discs or steel balls which ride in grooves disposed angularly to the vertical support axis to achieve a wedging or clamping action. During a lifting operation of the mold means have been provided to prevent slippage of the apparatus relative to the vertical support and this has generally been provided through complicated constructions of the hydraulically operated lifting devices. Due to such complicated design the gripping apparatus is often very sensitive so that a correct guiding or sliding of the molds is obtained. However, due to oxidation, dirt on the vertical supports where, deformation and the like to the grippers slipping or sliding relative to the vertical support inevitably takes place resulting in undesired concrete constructions.

The extent of such sliding and slipping heretofore mentioned varies between the different apparatuses and does not, of course, occur for equal distances and any deviation in either upward or downward sliding results in like motion of the concrete forms or molds. Therefore, without a uniform stroke or slide deformations in the finally cast concrete will take place resulting in undesired inclinations and the possible demolition of formed concrete constructions.

Further disadvantages of known apparatuses of this type involve the constant replacement of expensive, hardened special gripper jaws and the down-time due to such replacement interruptions obviously effects building costs. Also, due to prior art gripping jaw structures the vertical supports or bars are deformed and damaged at an unusually high rate, thereby requiring constant and costly replacement.

In keeping with the foregoing it is the primary object of this invention to provide an apparatus of the type mentioned heretofore which reduces gripper jaw change, reduces damage and deformation to vertical supports, and avoids the slipping, sliding or guiding of the gripper jaws relative to the vertical supports thus avoiding inaccurately cast concrete structures and likewise avoiding the demolition thereof.

The apparatus which achieves the latter-noted objects includes upper and lower pair of gripping jaws, preferably hudraulic means between the upper and lower pair of gripping jaws for imparting relative reciprocal motion therebetween, the pair of gripping jaws being pivotally connected to a lever, means mounting each lever for pivoting motion to move the jaws of each pair of gripping jaws obliquely toward and away from each other to respectively clamp and unclamp the same relative to a vertical support, and spring means remote from each of the pivot mounting means for biasing at least one jaw of each pair of gripping jaws toward the unclamped position thereof relative to a vertical support.

Still another object of this invention is to provide a novel apparatus of the type heretofore set forth wherein a second lever is pivotally connected to each of the pair of gripping jaws and second means mount each second lever for pivoting motion to control the movement of the jaws of each pair of gripping jaws obliquely toward and away from each other.

Still another object of this invention is to dispose the levers last-mentioned in a parallelogram linkage arrangement or fashion and to provide means for deactivating the spring means to preclude the upper and lower pair of gripping jaws from clampingly engaging the vertical support.

By constructing an apparatus in the manner mentioned the gripping jaws are moved in unison uniformally which precludes the canting thereof relative to the vertical supports. This avoids unilateral stresses which would deform the vertical supports. Moreover, the parallel linkage system obtains exact guidance of the gripping jaws toward and away from the vertical supports and the gripping jaws and vertical supports are subject to little wear or wear hardly worth mentioning. Slippage most importantly is eliminated and therefore inclinations of the molds and the resultant concrete structure is avoided thus precluding the necessity of demolitions of the concrete structure as well as the risk of such walls being pulled away from the vertical due to improper loading.

Due to the incorporation of the deactivating means in the apparatus the clamping action of the gripping jaws may be relieved relative to the vertical support thereby making it possible to move the molds as desired should there be, for example, interruptions in the concreting process. This is highly desirable as in known apparatuses any such interruptions result in the formation of recesses at the concrete walls in order to resume the concreting operation.

With the above and other objects in view that will hereinafter appear, the nature of the invention will be more clearly understood by reference to the following detailed description, the appended claimed subject matter, and the several views illustrated in the accompanying drawing.

IN THE DRAWINGS

FIG. 1 is a side elevational view of a novel apparatus for making concrete buildings in accordance with slide molding techniques and illustrates upper and lower gripping heads with hydraulic means therebetween for imparting reciprocal motion relative to a vertical support or bar.

FIG. 2 is a side elevational view of the apparatus of FIG. 1 looking from right-to-left with a portion thereof broken away for clarity, and illustrates the manner in which hydraulic fluid is introduced into and removed from the hydraulic cylinder to achieve reciprocal motion of the gripping heads.

Figure 3:
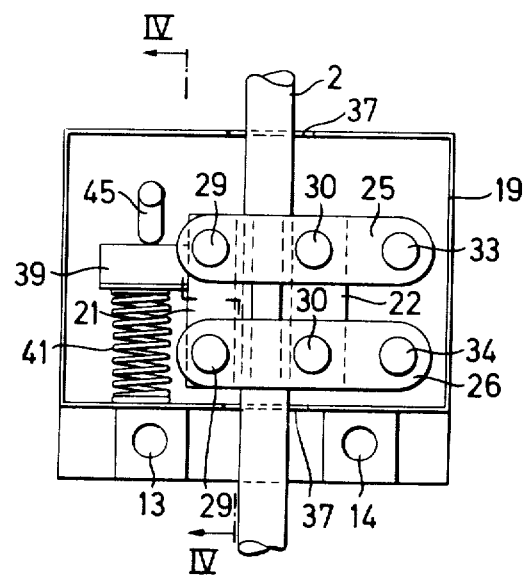
FIG. 3 is a cross-sectional view taken generally along line III—III of FIG. 2, and illustrates the unclamped postion of a pair of jaws of an upper gripping head as well as a spring tending to urge the jaws toward a clamped position.
Figure 4:
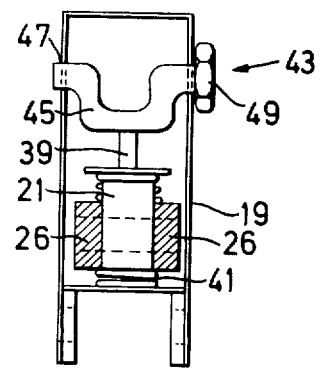
FIG. 4 is a cross-sectional view taken generally along line IV—IV of FIG. 3, and illustrates means for deactivating the spring to maintain the upper gripping jaws in their unclamped position.

A novel apparatus constructed in accordance with this invention for making concrete buildings in accordance with slide molding techniques or systems is illustrated in FIGS. 1 and 2 of the drawings, and it is generally designated by the reference numeral 1. The apparatus 1 is associated with a vertical support 2 generally in the form of a cylindrical steel bar which is suitably supported generally in a vertical plane. The apparatus 1 includes an upper gripping head 3, a lower gripping head 4, and means in the form of a lifting assembly 5 between the gripping heads 3 and 4 for imparting linear and/or reciprocal motion therebetween.

The lifting assembly 5 includes a pair of lifting cylinder units 6 and 7 each provided with a piston 8 and a piston rod 9 sliding in a cylinder 10 defining a chamber 10a. At both ends of the chamber 10a there are provided ports 11 and 12 for the feeding and discharge respectively of hydraulic fluid means as, for example, or like liquid, although air under pressure may be substituted in lieu thereof. The cylinder units 5 and 6 are secured to the upper gripping head 3 by bolts or pivot pins 13, 14 and to the lower gripping head 4 by means of bolts or pivot pins 15, 16. A pair of interconnected supports 17, 18 are connected to each other and to the upper gripping head 3, and it is to the supports 17 and 18 to which the mold forms are connected to produce a particular concrete structure.

Figure 5:
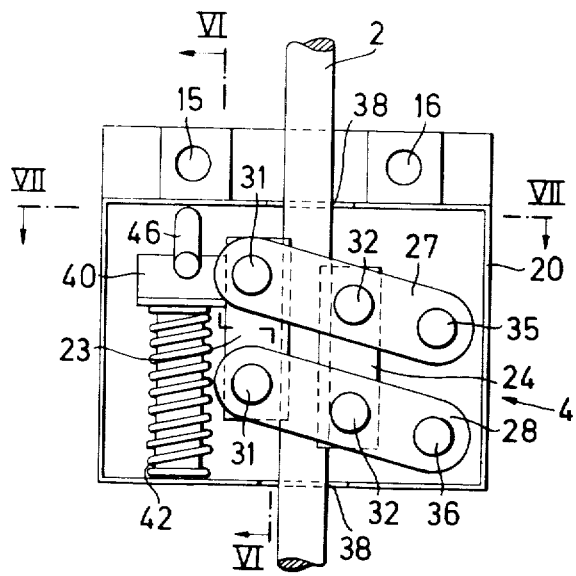
FIG. 5 is a cross-sectional view taken generally along line V—V of FIG. 2, and illustrates a pair of lower gripping jaws in their clamped position and being retained thereat by a compression spring.

The gripping heads 3 and 4 are identical and include respective casings or housings 19, 20, housing respective gripping jaws 21, 22 (FIG. 3) and 23, 24 (FIG. 5). The gripping jaws 21, 22 and 23, 24 are disposed on opposite sides of the vertical support or steel bar 2 and are hingedly or pivotally connected to each other by levers 25, 26 and 27, 28, respectively. The pivotal connections are achieved by bolts 29, 29; 30, 30 and 31, 31; 32, 32, respectively, which extend through the respective gripping jaws 21, 22 and 23, 24. The latter-described connections define a generally parallelogram linkage arrangement between the levers and the gripping jaws, as is readily apparent in FIGS. 3 and 5 of the drawings. The levers 25 and 26 are pivotally mounted by means 33, 34, respectively, relative to the housing 19 while the levers 27, 28 are likewise mounted for pivoting motion to the housing 20 by means of pivot pins 35, 36 (FIG. 5).

The casings or housings 19, 20 have respective apertures 37, 37 and 38, 38 through which extend the vertical support or steel bar 2, and which have a diameter greater than that of the latter.

Figure 6:
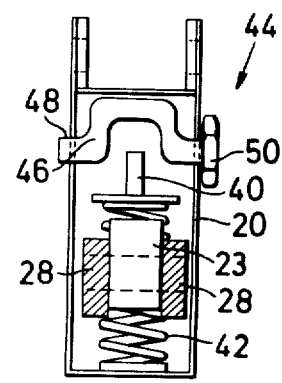
FIG. 6 is a cross-sectional view taken generally along line VI—VI of FIG. 5, and illustrates the spring deactivating means of the lower clamping or gripping head in the inoperative position thereof.
Figure 7:
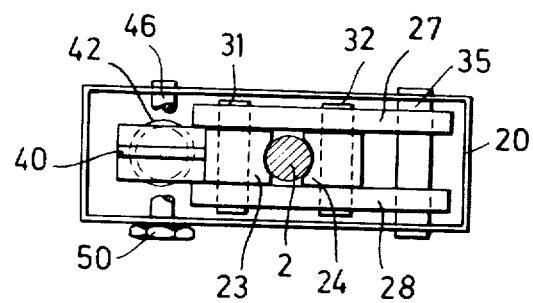
FIG. 7 is a cross-sectional view taken generally along line VII—VII of FIG. 5, and illustrates the manner in which a circular cross-sectioned vertical support or bar is gripped between jars of the low gripping head.

The gripping faces (unnumbered) of the gripping jaws 21–24 correspond to and engage in the exterior surface of the vertical support 2, in the manner best illustrated in FIG. 7. The jaw 21 of the upper pair of gripping jaws 21, 22 within the housing 19 has welded or otherwise secured thereto a projection 39 whereas the jaw 23 of the pair of gripping jaws 23, 24 of the lower pair of gripping jaws has welded or otherwise secured thereto a projection 40. Respective compression springs 41, 42 are housed between the projections 39, 40 and a lower wall (unnumbered) of the respective housings 19, 20. As is readily apparent from FIGS. 3 and 5, the springs 41, 42 impart an upward biasing force to the projections 39, 40 in a direction tending to move the respective jaws 21, 22 and 23, 24 obliquely toward each other in a direction in which the same will clamp the vertical support 2. The clamping position (FIG. 5) may be deactivated as to both gripping heads 19, 20 by means of deactivating means 43, 44, respectively, having respective cranks 45, 46 supported in bearings 47, 48, respectively, of the housings 19, 20. The cranks 45, 46 include handles 49, 50, respectively. Each crank 45, 46, may, of course, be replaced by an eccentric since the function thereof is the equivalent thereto. In one position of rotation of the cranks 45, 46 the projections 39, 40 are depressed, in the manner illustrated only in FIG. 3, such that the jaws 21, 22 are held in an unclamped position. However, should the cranks 45, 46 be moved to the position shown in FIGS. 5 and 6 the jaws are biased by the springs 41, 42 to the clamping position as is best illustrated in FIGS. 5 and 7.

In the operation of the apparatus 1 hydraulic liquid under pressure is fed through the port 11 into the chamber 10a underneath the piston 8 causing the gripping head 3 to be lifted vertically which, of course, moves the mold or form therewith which is carried by the supports 17 and 18. During this lifting motion the jaws 23, 24 of the lower gripping head 4 are in the clamped position (FIG. 5) under the influence of the spring 42, whereas the jaws 21, 22 of the upper gripping head 3 are in the unclamped position (FIG. 3). Once a predetermined height has been reached the crank 45 is rotated to the position of the crank 46 illustrated in FIG. 6 resulting in the spring force of the spring 41 urging the jaws 21, 22 into clamping engagement with the vertical support 2. At this point the jaws 21, 22, 23 and 24 are in clamping engagement with the vertical support 2 and assure that the entire apparatus 1 and the mold carried thereby will not slide vertically downwardly as concrete is poured in the molds carried by the support 17, 18.

Upon the introduction of liquid under pressure into the aperture 12 the cylinders 6 and 7 with the lower gripping head 4 are lifted to a height corresponding to that first realized when liquid is introduced into the port 11, it being assumed, of course, that during this operation the jaws 23, 24 of the gripping head 4 are released from the vertical support 2 by activating the crank 46 to compress the spring 42. In this manner by alternately feeding pressure through the ports 11 and 12 the apparatus 1 can be progressively lifted along with the slide molds connected thereto.

The apparatus 1 further includes the advantage of permitting constant reciprocal motion to be applied to the gripping head 3 when the jaws 21, 22 are in the unclamped position thereof (FIG. 3). Assuming that concrete within the mold carried by the support 17, 18 which are in turn carried by the gripping head 3 is setting liquid under pressure is alternately supplied through the apertures 11 and 12 of the respective cylinder units 6 and 7. This results in a constant up and down sliding of the upper gripper head 3 along with a like up and down sliding of the mold carried by the support 17 and 18. Such up and down movement without an overall lifting of the apparatus 1 permits the concrete to harden while in motion and prevents the same from adherring to the mold, thereby achieving ready release or subsequent operations.

While preferred forms and arrangements of parts have been shown in illustrating the invention, it is to be clearly understood that various changes in detail and arrangement of parts may be made without departing from the spirit and scope of this disclosure.

I claim:

1. Apparatus for making concrete buildings in accordance with slide molding systems comprising an upper pair of gripping jaws and a lower pair of gripping jaws, means between said upper and lower pair of gripping jaws for imparting relative reciprocal motion therebetween, each pair of gripping jaws being pivotally connected at spaced points to one each of a pair of levers, means mounting each lever for pivotal movement about a fixed axis, each pair of gripping jaws and its associated lever defining a parallelogram linkage mechanism for disposing each pair of levers both parallel and obliquely relative to each other to define respective unclamped and clamped positions thereof, individual spring means connected to one of each of said pair of jaws for biasing the associated pair of jaws toward a position at which said levers are in the obliquely related positions thereof, and individual means for deactivating each spring means separately to permit the levers associated therewith to be moved by the associated spring means to their oblique position to thereby clamp a vertical support therebetween.

2. The apparatus as defined in claim 1 wherein one jaw of each pair of gripping jaws includes a projection, and means locating each spring means relative to an associated projection for biasing its associated one jaw toward the oblique position of its associated levers at which the associated pair of jaws are in the clamped position thereof.

3. The apparatus as defined in claim 1 wherein each said deactivating means includes a crank arm, means mounting each said crank arm for pivotal motion, and each crank arm having means carried thereby offset from the pivot axis of its associated spring means to a position at which said links are in parallel relation to each other and the associated clamping jaws thereof are in their unclamped position.

4. The apparatus as defined in claim 2 wherein each said deactivating means includes a crank arm, means mounting each said crank arm for pivotal motion, and each crank arm having means carried thereby offset from the pivot axis of its associated crank arm for urging its associated spring means to a position at which said links are in parallel relation to each other and the associated clamping jaws thereof are in their unclamped position.

5. The apparatus as defined in claim 2 including a housing for each pair of levers, clamping jaws and their associated spring means, said housing having opposite walls, and said crank arm being mounted for said pivotal motion in said opposite housing walls.

6. The apparatus as defined in claim 5 wherein said deactivating means are located in each housing between said opposite walls.

7. The apparatus as defined in claim 3 including a housing for each pair of levers, clamping jaws and their associated spring means, said housing having opposite walls, and said crank arm being mounted for said pivotal motion in said opposite housing walls.

8. The apparatus as defined in claim 7 wherein said deactivating means are located in each housing between said opposite walls.

* * * * *